Patented Sept. 19, 1933

1,927,127

UNITED STATES PATENT OFFICE 1,927,127

HALOGEN DERIVATIVES OF THE ANTHRA-QUINONE-ACRIDONE SERIES AND PROCESS OF MAKING THEM

Max Albert Kunz, Mannheim, and Erich Berthold and Karl Koeberle, Ludwigshafen-on-the-Rhine, Germany, assignors to General Aniline Works, Inc., New York, N. Y., a corporation of Delaware No Drawing. Application August 14, 1930, Serial No. 475,403, and in Germany August 20, 1929

11 Claims. (Cl. 260—37)

The present invention relates to halogen derivatives of anthraquinone-$\beta.\alpha$(N)-benzacridones and process of producing same.

We have found that valuable vat dyestuffs are obtained by treating anthraquinone-$\beta.\alpha$(N)-benzacridones or their derivatives with halogen or agents supplying halogen in the absence of organic diluents which expression is to be understood to comprise halogenation in the absence of any diluent and halogenation in organic media. Water with or without neutral, acid or alkaline additions, sulphuric acid of different concentrations, oleum, chlorosulphonic acid or molten metal chlorides to which salts may be added for lowering the melting point, may be employed as the inorganic media. The halogenation is preferably carried out in inorganic acid media. When halogenating in aqeous suspension the acid formed during halogenation may also be neutralized as soon as it is formed or the hydrogen ion concentration of the reaction mixture may be kept constant by the addition of suitable buffer compounds. The halogenation is preferably carried out in the presence of halogen transferrers, such as metals and metal salts as for example iron, iron chloride, mercury, antimony or non-metals such as iodine and sulphur.

Derivatives of anthraquinone-$\beta.\alpha$(N)-benzacridone which may be halogenated according to the present invention include not only those anthraquinone-$\beta.\alpha$(N)-benzacridones which contain substituents other than halogen and diacridones as for example 2.1(N).6.5(N)-dibenzacridone, but also halogen derivatives which have been prepared for example either synthetically or by the halogenation of anthraquinone-$\beta.\alpha$(N)-benzacridone in any manner hitherto proposed, for example in organic solvents. The products obtained according to the present invention differ substantially from the last mentioned substances as regards shade of colour and also by their superior properties as regards fastness. For example, by treatment of anthraquinone-2.1(N)-benzacridone with chlorine in the presence of chlorsulphonic acid, a trichloroanthraquinone-2.1(N)-benzacridone is obtained which yields very fast, pure red dyeings on the vegetable fibre, while by treatment of the same initial material by methods already known, as for example by treating the anthraquinone-2.1(N)-benzacridone with sulphuryl chloride in nitrobenzene, a trichloroanthraquinone-2.1(N)-benzacridone is obtained which gives red violet dyeings.

Especially valuable dyestuffs are obtained by the halogenation according to the present invention of initial materials which already contain halogen, in particular of Bz3.Bz5-dihalogenanthraquinone-2.1(N)-benzacridones which when halogenated in the before-described manner in an inorganic acid medium, furnish the new Bz2.3.5-trihalogenanthraquinone-2.1(N)-benzacridones.

Thus for example by treating Bz3.Bz5-dichlor-4-chloranthraquinone-2.1(N)-benzacridone with chlorine in chlorsulphonic acid at from 20° to 40° C., preferably in the presence of halogen transferrers as for example iron, sulphur or iodine, a tetrachloranthraquinone-2.1(N)-benzacridone is obtained, which, in contrast to the initial material which dyes red violet shades, yields red dyeings on cotton.

According to the present invention the properties of the initial dyestuff are substantially altered even by the introduction of only a little halogen into anthraquinone-$\beta$.(N)-benzacridone which already contain halogen. Thus for example the Bz3.5-dichloroanthraquinone-2.1(N)-benzacridone which dyes cotton red shades, yields a reaction product having only a slightly increased chlorine content but giving substantially stronger and purer shades than the initial material, by treatment for only a short period of time with chlorine in the presence of chlorsulphonic acid and in the presence of iron or sulphur as a catalyst, preferably at temperatures between about 20° and 40° C. in special cases, for instance temperatures elevated to about 60° C. and in the presence of iodine transferrers, the halogen of the chlorsulphonic acid may be employed for the halogenation. By treatment for a long time with the corresponding amount of chlorine, a trichloranthraquinone-2.1(N)-benzacridone is obtained, which yields powerful, clear, yellowish red dyeings. It is isomeric with the Bz3.Bz5-dichlor-4-chloranthraquinone-2.1 (N)-benzacridone giving red violet dyeings obtainable from Bz3.Bz5-dichloranthraquinone-2.1(N)-benzacridone by treatment with chlorine in trichlorbenzene in the presence of iodine and which is identical with the product obtainable with sulphuryl chloride in nitrobenzene.

When the anthraquinone-$\beta$.(N)-benzacridones employed as initial materials are produced by means of an inorganic medium which may be used according to the present invention as dissolving or suspending medium, the halogenation may be carried out in the same inorganic medium by means of which the acridone is produced without isolating it.

The reaction products are usually obtained in very good yields and in a state of great purity, and may be still further purified as desired by the usual methods, as for example by crystallization or by way of their salts as for example by way of their sulphates or by treatment with oxidizing agents such as sodium hypochlorite. They may be employed as dyestuffs and also as intermediate products for the preparation of other dyestuffs. The solutions of the reaction products in concentrated sulphuric acid are usually orange coloured and the vats usually have a blue or violet colour.

The following examples will further illustrate how the said invention may be carried out in practice but the invention is not restricted to these examples. The parts are by weight.

Example 1

20 parts of anthraquinone-2.1(N)-benzacridone, obtainable for example by condensation of 1-chloranthraquinone with anthranilic acid with subsequent ring closure to form the acridone, are dissolved in 200 parts of chlorsulphonic acid with the addition of 1 part of iodine. Chlorine is then led into this solution at room temperature until a sample taken out dyes cotton red shades. After dilution with sulphuric acid, the melt is poured onto ice and filtered by suction. The resulting product dissolves in concentrated sulphuric acid giving a red yellow colouration and dyes cotton from a violet vat substantially more powerful, more yellowish red shades than the initial material.

If Bz3-methylanthraquinone-2.1(N)-benzacridone be chlorinated in an analogous manner in chlorsulphonic acid or sulphuric acid a product which yields somewhat more bluish red shades is obtained.

Example 2

33 parts of anthraquinone-2.1(N)-benzacridone are introduced while stirring at from 120° to 130° C. into a melt of 250 parts of aluminium chloride and 50 parts of common salt. Chlorine gas is then led into the melt until a sample taken out yields pure red dyeings. The melt is then allowed to cool, dissolved in water or dilute acid and filtered off by suction. The resulting chloranthraquinone-2.1(N)-benzacridone dissolves in concentrated sulphuric acid giving an orange colouration and yields a violet vat from which cotton is dyed red shades of excellent fastness.

By employing, instead of anthraquinone-2.1(N)-benzacridone, its substitution products as for example Bz-alkyl- or Bz-alkoxy-anthraquinone-2.1(N)-benzacridones which may be produced by condensation of para-alkoxyanilines with 1-chloroanthraquinone-2-carboxylic acid and ring closure to form the acridone, or anthraquinone-2.1(N)-benzacridones which are substituted in the anthraquinone nucleus, halogenation products which generally speaking have deeper shades of colour are obtained.

Example 3

32.5 parts of anthraquinone-2.1(N)-benzacridone are dissolved together with 1.6 parts of iodine in 300 parts of chlorsulphonic acid. 32 parts of bromine are added, the whole is stirred for some time at room temperature and the temperature is then raised slowly to 60° C. until a sample taken out dyes cotton more yellowish red shades than the initial material, which is usually the case after from about 2 to 3 hours. The whole is then worked up in the usual manner. The resulting product dissolves in concentrated sulphuric acid giving a red yellow colouration and dyes cotton from a violet vat powerful red shades of excellent fastness to light and weather.

Example 4

10 parts of Bz3.Bz5-dichloranthraquinone-2.1(N)-benzacridone, obtainable by condensation of 1-chloranthraquinone-2-carboxylic acid with 2.4-dichloroaniline and ring closure to form the acridone, are dissolved in 100 parts of chlorsulphonic acid. After the addition of 0.1 part of iron chloride, a fairly rapid stream of chlorine is led into the solution for from 1 to 2 hours at from 15° to 20° C., the solution is diluted with sulphuric acid, poured into ice cold water and filtered by suction. The resulting dyestuff contains only slightly more chlorine than the amount calculated for the dichloro derivative. It is a red powder which dissolves in concentrated sulphuric acid giving a red yellow colouration and dyes cotton from a violet vat substantially clearer red shades than the initial material.

Example 5

10 parts of Bz3.Bz5-dichloranthraquinone-2.1(N)-benzacridone are dissolved in chlorsulphonic acid as described in the preceding Example 4, and after the addition of 0.1 part of sulphur, are treated with chlorine for from 5 to 7 hours at from 20° to 40° C. The resulting dyestuff is worked up in the usual manner. It is a brick red powder which dissolves in concentrated sulphuric acid giving a yellow red colouration and yields very clear yellowish red shades from a violet vat. Its chlorine content corresponds to a trichloranthraquinone-2.1(N)-benzacridone. The dyestuff crystallizes in fine yellow red needles from solvents of high boiling point such as nitrobenzene or trichlorbenzene.

Monohydrate or sulphuric acid may be employed as solvents instead of chlorsulphonic acid with the same result.

Example 6

14 parts of Bz3.Bz5-dichloranthraquinone-2.1(N)-benzacridone are introduced at from 120° to 130° C. into a melt of 100 parts of aluminium chloride and 20 parts of common salt. Chlorine gas is then led in until a sample taken out yields clear yellowish red dyeings on cotton. The melt is then allowed to cool, dissolved in water or dilute acid, boiled for a short time and filtered by suction. The reaction mixture which is obtained in very good yields and in a state of great purity, dissolves in concentrated sulphuric acid giving an orange colouration and yields a violet vat from which cotton is dyed more yellowish red shades than by the initial material.

An iron chloride and sodium sulphate melt or an iron chloride and sodium chloride melt may be employed instead of the aluminium chloride and common salt melt.

The bromo or chlorbromo derivatives prepared in an analogous manner yield somewhat more bluish shades on cotton.

Example 7

37.4 parts of Bz3.Bz5-dichloranthraquinone-2.1(N)-benzacridone are dissolved in 370 parts of chlorsulphonic acid at 15° C. After the addition of 3 parts of sulphur, 32 parts of bromine are added and the whole is kept for 2 hours at room temperature, for 1 hour at 40° C. and then for from 3 to 4 hours at 60° C. After cooling, the reaction mixture is diluted with 200 parts of monohydrate and is worked up in the usual manner. The resulting dyestuff which is a monobromo - Bz3.Bz5 - dichloranthraquinone - 2.1(N) - benzacridone, dissolves in concentrated sulphuric acid giving an orange colouration and yields bluish red dyeings having excellent properties as regards fastness on cotton from a violet vat.

Other halogen transferrers, as for example, antimony, may be employed instead of sulphur.

Example 8

20 parts of 4-nitro-Bz3.Bz5-dichloranthraquinone-2.1(N)-benzacridone obtainable by nitrating Bz3.Bz5-dichloranthraquinone-2.1(N)-benzacridone acid in nitrobenzene by means of concentrated nitric acid are dissolved in 200 parts of chlorsulphonic acid with the addition of 2 parts of sulphur. Chlorine is led into this solution for from 5 to 7 hours at 20° C.

The reaction mixture is then worked up in the usual manner. The resulting dyestuff yields powerful grey blue dyeings having excellent properties as regards fastness on cotton from a red violet vat, whereas the initial material yields dyeings which are much more greenish.

Example 9

10 parts of Bz3.Bz5-dichlor-4-chloranthraquinone-2.1(N)-benzacridone, obtainable for example by chlorination of anthraquinone-2.1(N)-benzacridone with chlorine in trichlorbenzene, are dissolved in 100 parts of chlorsulphonic acid, and, after the addition of 0.1 part of iron chloride, chlorine is led in at from 25° to 30° C. until a sample taken out yields red dyeings. The reaction mixture is then diluted with sulphuric acid, poured into ice-cold water and the reaction product, which is a tetrachloranthraquinone-2.1(N)-benzacridone, is filtered off by suction. It is a red powder which dissolves in concentrated sulphuric acid giving a yellow red colouration and yields fast red dyeings on cotton from a violet vat.

Other chlorine transferrers such as sulphur, iron and the like may be employed instead of iron chloride.

Example 10

42.8 parts of Bz3.Bz5-dichlor-4-chloranthraquinone-2.1(N)-benzacridone are dissolved in 400 parts of chlorsulphonic acid. After the addition of 4 parts of sulphur and 32 parts of bromine, the whole is stirred for 1 hour at room temperature, the temperature is then raised slowly to 60° C. and the whole is kept at this temperature for 4 hours and is then worked up in the usual manner. The resulting dyestuff, which is a bromotrichloranthraquinone - 2.1 (N) - benzacridone, is a bluish red powder which dissolves in concentrated sulphuric acid giving a yellow red colouration and dyes cotton from a violet vat bluish red shades of good properties as regards fastness.

Example 11

40 parts of Bz3.Bz5-dichlor-4-chloranthraquinone-2.1(N)-benzacridone are introduced at from 90° to 100° C. into a melt of 200 parts of iron chloride and 30 parts of common salt. Chlorine gas is then led in while stirring until a sample taken out yields red dyeings. The melt after being allowed to cool, is taken up with water or dilute acid and filtered by suction. The resulting reaction product, which is a red powder, dissolves in concentrated sulphuric acid giving an orange colouration and yields a blue violet vat.

Another metal chloride as for example aluminium chloride, or phosphorus oxychloride, or phosphorus pentachloride may be employed as the agent for the melt instead of iron chloride.

Example 12

32.5 parts of a 10 per cent aqueous paste of anthraquinone-2.1(N)-benzacridone are heated, while stirring, to between 70° and 80° C. after the addition of 90 parts of bromine until a sample furnishes bluish red shades on cotton. The reaction mixture is then allowed to cool and worked up in the usual manner. The bromoanthraquinone-2.1(N)-benzacridone thus obtained is a dibromo derivative according to analysis, crystallizes in needles, dissolves in concentrated sulphuric acid to give an orange solution and furnishes a blue violet vat.

By passing a current of chlorine through a 10 per cent aqueous paste of anthraquinone-2.1(N)-benzacridone under the conditions hereinbefore stated a chloranthraquinone-2.1(N)-benzacridone is obtained. When brominating Bz-3-chloranthraquinone-2.1(N)-benzacridone in the aforedescribed manner, a chlorobromo derivative is obtained which dyes cotton bluish red shades from a violet vat.

Example 13.

10 parts of anthraquinone-2.1(N)-benzacridone are dissolved in 100 parts of chlorsulphonic acid, 1 part of sulphur being added to the solution. Chlorine is passed at ordinary temperature into the said solution until 2 atomic proportions of chlorine have been taken up. The reaction mixture is worked up in the usual manner. The dyestuff thus produced is a dichloranthraquinone-2.1(N)-benzacridone, a red powder, and dyes cotton from a violet vat strong red shades of excellent fastness.

When adding the same amount of iodine as halogenating catalyst instead of sulphur, higher chlorinated products are obtained under the same working conditions.

A trichloroanthraquinone-2.1(N)-benzacridone can be obtained in an analogous manner. It dyes cotton from a violet vat red shades with a more yellowish tinge than the aforesaid dichloroderivative.

Example 14

10 parts of Bz3-methylanthraquinone-2.1(N)-benzacridone (obtainable by condensing 1-chloroanthraquinone-2-carboxylic acid with para-toluidine and ring-closure to form the acridone) are treated with chlorine in chlorosulphonic acid in the presence of sulphur or iron in the manner described in the foregoing example. The dyestuff thus produced, a dichloro derivative according to analysis is a blue red powder which dissolves in concentrated sulphuric acid to give a yellow-red solution and dyes cotton from a violet vat fast bluish red shades.

Dyestuffs having similar properties are obtained by employing other Bz-methyl derivatives instead of the Bz3-methyl derivative hereinbefore described.

Example 15

Chlorine is passed for about 2 hours into a solution of 10 parts of Bz3-nitroanthraquinone-2.1(N)-benzacridone in 100 parts of chlorosulphonic acid to which 0.2 part of iodine has been added. After working up, a dyestuff is obtained forming a brown yellow powder, dissolving with a reddish yellow colouration in concentrated sulphuric acid and dyeing cotton from a violet vat green shades.

Example 16

Chlorine is passed at between 20° and 25° C. for about 6 hours into a solution of 5 parts of Bz3.Bz5-dimethylanthraquinone-2.1(N)-benzacridone (obtainable by condensing 1-chloranthraquinone-2-carboxylic acid with meta-xylidine and ring-closure to form the acridone) in 100 parts of chlorsulphonic acid to which 0.5 part of sulphur has been added. After working up a dyestuff, which is a dichloro derivative according to analysis, is obtained and this dissolves in concentrated sulphuric acid to give a yellow red solution and dyes cotton from a blue red vat reddish violet shades.

Example 17

A current of chlorine is passed at 20° C. for about 5 hours into a solution of 50 parts of anthraquinone-2.1(N).6.5(N)-dibenzacridone (obtainable by condensing 1 molecular proportion of 1.5-dichloranthraquinone with 2 molecular proportions of anthranilic acid and condensation to form the acridone) in 500 parts of chlorosulphonic acid to which 0.5 part of iron chloride has been added. The reaction mixture is worked up in the usual manner and a product is obtained which dissolves in concentrated sulphuric acid to give a yellow red solution and dyeing cotton from a violet vat violet shades of excellent fastness to light and atmospheric influences.

A dyestuff having similar properties is obtained by brominating anthraquinone-2.1(N).6.5(N)-dibenzacridone in chlorosulphonic acid at between 20° and 30° C. in the presence of iodine.

Example 18

10 parts of Bz3.Bz5-dichloroanthraquinone-2.1(N)-benzacridone are dissolved in 100 parts of oleum containing 23 per cent of sulphur trioxide. A current of chlorine is passed for about 2 hours at room temperature into the said solution after the addition of 1 part of sulphur, chlorine is passed in for a further hour at 40° C., the reaction mixture then being poured into ice water and the product filtered off. The dyestuff thus obtained is a trichloro derivative forming a brick red powder, dissolves in concentrated sulphuric acid to give a yellow red solution and dyes cotton from a violet vat very clear yellowish red shades.

Oleum containing more sulphur trioxide, or sulphuric acid monohydrate or sulphuric acid may also be used as solvents.

Example 19

10 parts of Bz3-chloranthraquinone-2.1(N)-benzacridone (obtainable by condensing 1-chloranthraquinone-2-carboxylic acid with para-chloraniline and ring closure to form the acridone in nitrobenzene by means of phosphorus pentachloride) are dissolved at room temperature in 100 parts of chlorosulphonic acid. After the addition of 2 parts of sulphur, chlorine is passed into the solution until a sample dyes strong red shades from a violet vat instead of the bluish red shades produced by the initial material. The reaction product is worked up in the usual manner.

The same dyestuff is also obtained by dissolving the aforesaid condensation product of 1-chloranthraquinone-2-carboxylic acid and parachloraniline, or the corresponding acid chloride, or amide or an ester of the said acid, in chlorosulphonic acid and stirring until ring closure to form the acridone has taken place and then passing in chlorine as already stated.

In order to produce the dyestuff in a quite pure form it may be treated with a solution of sodium hypochlorite or recrystallized from high boiling solvents, as for example nitrobenzene, or it may be purified by way of its oxonium sulphate.

Example 20

A current of chlorine is passed at room temperature into a solution of 20 parts of Bz5-chloranthraquinone-2.1(N)-benzacridone (obtainable by condensing 1-chloranthraquinone-2-carboxylic acid with ortho-chloraniline and ring closure to form the acridone) in ten times the amount of chlorosulphonic acid to which 2 parts of sulphur have been added, until a sample furnishes on cotton from a violet vat strong red shades instead of the faint bluish red shades produced by the initial material. By working up the reaction mixture in the usual manner a trichloro derivative is obtained which dissolves in concentrated sulphuric acid to give a yellow red solution.

Example 21

8 parts of Bz2.Bz3-dichloranthraquinone-2.1-(N)-benzacridone (obtainable by condensation of 1-chloranthraquinone-2-carboxylic acid with 3.4-dichloroaniline and ring closure to form the acridone) dissolved in 100 parts of chlorosulphonic acid are treated, after the addition of 0.5 part of iodine, with 6.5 parts of bromine at room temperature. The temperature is raised to 60° C. and kept constant for about 6 hours. After cooling and diluting with sulphuric acid monohydrate the reaction mixture is poured onto ice and the reaction product containing bromine and chlorine filtered off. It dissolves in concentrated sulphuric acid to give a yellow red solution and dyes cotton from a violet vat full bluish red shades of good fastness.

Sulphur, antimony or iron may be used as halogenating catalysts instead of iodine.

Example 22

A current of chlorine is passed at between 20° and 25° C. for about 8 hours into a solution of 20 parts of Bz2.Bz3-dichloranthraquinone-2.1(N)-benzacridone and 2 parts of sulphur in 200 parts of chlorosulphonic acid. The dyestuff obtained by working up the reaction mixture in the usual manner dissolves in concentrated sulphuric acid to give a yellow red solution and dyes cotton from a violet vat red shades.

A dyestuff having similar properties is obtained in an analogous manner from Bz3.Bz4-dichloranthraquinone-2.1(N)-benzacridone.

Example 23

A current of chlorine is passed at 20° C. for about 7 hours into a solution of 10 parts of Bz2.Bz4-dichloroanthraquinone-2.1(N)-benzacridone (obtainable by condensing 1-chloranthraquinone-2-carboxylic acid with 3.5-dichloraniline and ring closure to form the acridone) dissolved in ten times the amount of chlorosulphonic acid after the addition of 1 part of sulphur. The dyestuff (a trichloranthraquinone-2.1(N)-benzacridone according to analysis) obtained by working up the reaction mixture in the usual manner, is a yellow red powder, dissolves in concentrated sulphuric acid giving a yellow red solution and dyes cotton from a violet vat strong clear orange red shades of excellent fastness to light and atmospheric influences.

*Example 24*

10 parts of Bz2.Bz3.Bz4-trichloranthraquinone-2.1(N)-benzacridone (obtainable by condensing 1-chloranthraquinone-2-carboxylic acid with 3.4.5-trichloraniline and ring closure to form the acridone according to known methods) and 1 part of sulphur are dissolved in 100 parts of chlorosulphonic acid. A current of chlorine is passed at 25° C. for between 12 and 14 hours into the said solution. The dyestuff, obtained by working up the reaction mixture in the usual manner (a tetrachloro derivative according to analysis) is a yellow powder, dissolving in concentrated sulphuric acid to give a yellow red solution and dyeing cotton from a violet vat orange red shades of good fastness to light and atmospheric influences.

The same dyestuff is also obtained by dissolving the condensation product of 1-chloranthraquinone-2-carboxlyic acid with 3.4.5-trichloraniline or an ester thereof, as for example its benzyl ester, in chlorosulphonic acid, stirring the solution until ring-closure to form the acridone has taken place and chlorinating in the manner already described.

In order to produce the dyestuff in a particularly pure form it may be purified in the following manner: 30 parts of the dyestuff are dissolved in 90 parts of concentrated sulphuric acid. Between 25 and 30 parts of water are added, while stirring, to the said solution, whereby the temperature rises to between 50° and 70° C. and the oxonium sulphate is precipitated in crystalline form. The precipitate is filtered off and decomposed by means of water.

*Example 25*

6.4 parts of bromine are mixed with 8.5 parts of Bz2.Bz3.Bz5-trichloranthraquinone-2.1(N)-benzacridone (obtainable by condensing 1-chloranthraquinone-2-carboxylic acid with 2.3.5-trichloraniline and ring-closure to form the acridone) 100 parts of chlorosulphonic acid and 1 part of sulphur or iodine, the mixture being stirred at between 60° and 65° C. until all of the bromine has been taken up. After cooling the reaction mixture is worked up in the usual manner. The dyestuff obtained, a monobromotrichloro derivative according to analysis, dissolves in concentrated sulphuric acid to give a yellow red solution and dyes cotton from a violet vat strong bluish red shades.

*Example 26*

10 parts of Bz4-chloranthraquinone-2.1(N)-benzacridone (obtaintable by condensing 1-chloranthraquinone-2-carboxylic acid with meta-chloraniline, ring-closure to form the acridone and separation of the resulting mixture of Bz2- and Bz4-chloranthraquinone-2.1(N)-benzacridone by crystallization from organic solvents or by way of the oxonium sulphates) are dissolved in 100 parts of chlorosulphonic acid and a current of chlorine is passed at between 20° and 25° C. for about 6 hours through the solution to which 1 part of sulphur has been added. The dyestuff obtained by working up the reaction mixture in the usual manner, a mixture of a di- and trichloro derivative according to analysis, dissolves in concentrated sulphuric acid to give a yellow red solution and dyes cotton from a violet vat fast clear yellowish red shades.

*Example 27*

10 parts of Bz2-chloranthraquinone-2.1(N)-benzacridone (obtainable as described in the foregoing example) are treated with chlorine and worked up as described in the foregoing example. The dyestuff obtained dissolves in concentrated sulphuric acid giving a yellow red solution and dyes cotton from a violet vat clear orange red shades.

Sulphuric acid, sulphuric acid monohydrate or oleum may be used as solvents instead of chlorsulphonic acid.

*Example 28*

4 parts of Bz2.3-dichloranthraquinone-2.1(N)-benzacridone are heated to boiling under a reflux condenser with 20 parts of bromine and 0.1 part of iodine for 2 hours. After cooling, the reaction mixture is poured into dilute caustic soda solution and filtered. The dyestuff thus obtained a monobromo - Bz2.3 - dichloranthraquinone-2.1(N)-benzacridone, dissolves in concentrated sulphuric acid giving a yellow red solution and dyes cotton from a violet vat powerful, clear red shades.

*Example 29*

20 parts of 4-nitro-Bz3.5-dichloranthraquinone-2.1-(N)-benzacridone are dissolved in 200 parts of chlorosulphonic acid with the addition of 2 parts of sulphur. 20 parts of bromine are run into the solution which is then heated for 4 hours at 40° C. and then for 6 to 8 hours at 70° C. After cooling, the reaction mixture is worked up in the usual manner. The resulting dyestuff, which is a 4-nitro-Bz2-bromo-Bz3.5-dichloranthraquinone-2.1(N)-benzacridone, dissolves in concentrated sulphuric acid giving an shades from a violet vat.

*Example 30*

The dyestuff obtained as before described in Example 5 may be purified by the following methods:

10 parts of the dyestuff in the form of a 10 per cent aqueous paste are heated to boiling after the addition of 20 parts of a sodium hypochlorite solution containing 12 per cent of active chlorine until the paste does not any more become brighter. The dyestuff thus obtained dyes cotton clearer red shades than the crude product.

The dyestuff may also be purified by dissolving 10 parts thereof in 30 parts of concentrated sulphuric acid or sulphuric acid monohydrate. Water or dilute sulphuric acid is allowed to run slowly into the said solution until the oxonium sulphate begins to separate. After standing for a short time the separated thick crystalline pulp is filtered off, washed with a little dilute sulphuric acid and the oxonium sulphate decomposed by means of water.

What we claim is:—

1. A process of producing halogenated anthraquinone-β.α(N)-benzacridones, which comprises acting on an anthraquinone-β.α(N)-benzacridone dissolved in an inorganic acid medium with a halogenating agent.

2. A process of producing halogenated anthraquinone-β.α(N)-benzacridones, which comprises acting on an anthraquinone-β.α(N)-benzacridone dissolved in sulphuric acid with a halogenating agent.

3. A process of producing halogenated anthraquinone-β.α(N)-benzacridones, which comprises acting on an anthraquinone-β.α(N)-benzacridone dissolved in chlorosulphonic acid with a halogenating agent.

4. A process of producing halogenated anthraquinone-β.α(N)-benzacridones, which comprises acting on an anthraquinone-β.α(N)-benzacridone dissoived in an inorganic acid medium with a halogenating agent in the presence of a halogenating catalyst.

5. Anthraquinone-2.1(N)-benzacridones corresponding to the formula:

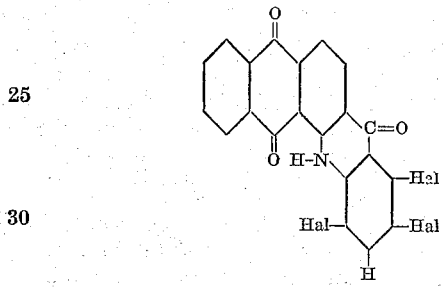

in which the 4-position in the anthraquinone nucleus may be substituted by halogen or nitro groups, the said acridones dissolving in concentrated sulphuric acid giving yellow to red solutions and furnishing violet vats.

6. Anthraquinone-2.1(N)-benz-acridones corresponding to the formula:

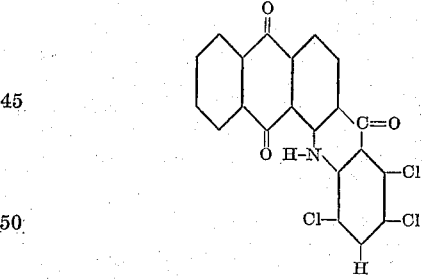

in which the 4-position in the anthraquinone nucleus may be substituted by halogen or nitro groups, the said acridones dissolving in concentrated sulphuric acid giving yellow to red solutions.

7. Anthraquinone-2.1(N) - benzacridones corresponding to the formula:

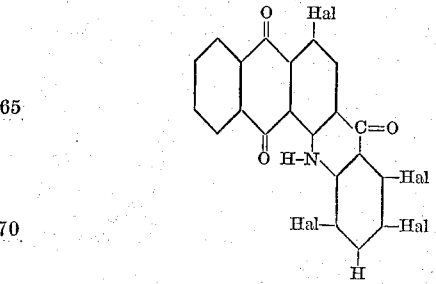

dissolving in concentrated sulphuric acid giving yellow to red solutions and dyeing cotton red to blue red shades.

8. The anthraquinone - 2.1(N) - benzacridone corresponding to the formula:

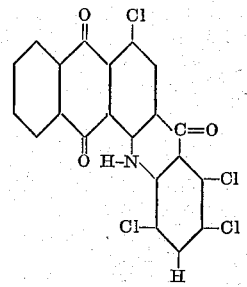

dissolving in concentrated sulphuric acid giving a yellow red solution and dyeing cotton bluish red shades from a violet vat.

9. Anthraquinone-2.1(N)-benzacridones corresponding to the formula:

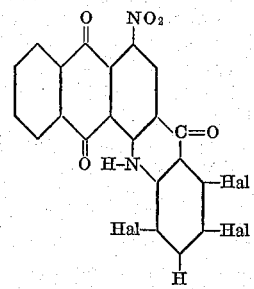

dissolving in concentrated sulphuric acid with orange colourations and dyeing cotton from violet vats grey blue shades.

10. The anthraquinone - 2.1(N)-benzacridone corresponding to the formula:

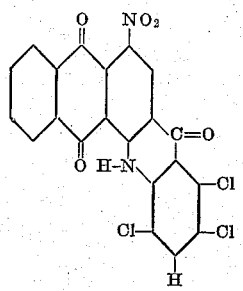

dissolving in concentrated sulphuric acid with an orange colouration and dyeing cotton from a violet vat grey blue shades.

11. The anthraquinone - 2.1(N)-benzacridone corresponding to the formula:

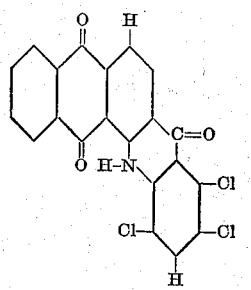

dissolving in concentrated sulphuric acid with a yellowish red colouration and dyeing cotton from a violet vat powerful yellowish red shades.

MAX ALBERT KUNZ.
ERICH BERTHOLD.
KARL KOEBERLE.